(12) United States Patent
Gasal et al.

(10) Patent No.: US 6,883,965 B2
(45) Date of Patent: Apr. 26, 2005

(54) SUPPORT FOR BALL TRANSFER UNIT

(75) Inventors: Steven Craig Gasal, Jamestown, ND (US); Mark Lyle Olson, Jamestown, ND (US)

(73) Assignee: Goodrich Corporation, Charlotte, NC (US)

(*) Notice: Subject to any disclaimer, the term of this patent is extended or adjusted under 35 U.S.C. 154(b) by 203 days.

(21) Appl. No.: 10/306,829

(22) Filed: Nov. 29, 2002

(65) Prior Publication Data

US 2003/0103698 A1 Jun. 5, 2003

(30) Foreign Application Priority Data

Nov. 30, 2001 (GB) .............................................. 0128714

(51) Int. Cl.[7] .......................... F16C 29/04; B65G 13/00
(52) U.S. Cl. .................................... 384/49; 193/35 MD
(58) Field of Search .............................. 384/49; 16/26; 193/35 MD

(56) References Cited

U.S. PATENT DOCUMENTS

| | | | | |
|---|---|---|---|---|
| 3,466,697 A | * | 9/1969 | Goodrich et al. ............... 16/26 |
| 3,739,894 A | * | 6/1973 | Hinman ................. 193/35 MD |
| 4,696,583 A | * | 9/1987 | Gorges ......................... 384/49 |
| 4,871,052 A | * | 10/1989 | Huber ................... 193/35 MD |

* cited by examiner

Primary Examiner—Thomas R. Hannon
(74) Attorney, Agent, or Firm—Andrus, Sceales, Starke & Sawall, LLP

(57) ABSTRACT

A support for use with a ball transfer unit associated, in use, with a double-skinned deck panel, the support being characterised by being elongate, rigid, and adapted at one end to receive the housing of a ball transfer unit and to seat beneath a peripheral shoulder of the housing which is presented in use towards the lower skin of the panel, the support further being shaped at its opposite end to present to the lower skin of the panel, in use, a "foot-print" which includes and exceeds the "foot-print" presented in use by the ball transfer unit housing to the lower skin of the panel, the length of the support being such that, in use, with the "foot-print" of the support engaging the lower skin of the panel, the ball of the ball transfer unit protrudes from the upper skin of the panel by a predetermined, desired amount. There is also disclosed a support and unit combination, a deck panel, and a method of repairing a deck panel.

12 Claims, 4 Drawing Sheets

SUPPORT FOR BALL TRANSFER UNIT

This invention relates to a support for a ball transfer unit, to a ball transfer unit and such a support in combination with one another, to a deck panel utilising such a combination and to a method of repairing a deck panel.

Ball transfer units (hereinafter referred to as BTUs) each comprise a housing resiliently supporting a ball which protrudes upwardly from the housing and which is supported, resiliently, within the housing on a ball race or similar low friction device. BTUs are utilised in load handling systems, notably in cargo holds of aircraft where a plurality of BTUs are mounted in a deck panel (often referred to as a ball mat) such that the ball of each BTU projects above the upper surface of the deck panel to provide low friction support for a cargo container and the like to be moved across the deck panel. A plurality of ball mats will be positioned adjacent one another to define the deck surface of the hold.

Generally BTU deck panels are double-skinned, comprising an upper skin in the form of a generally planar sheet, usually a metal sheet, above which the balls of the BTUs protrude, and a lower skin fixed parallel to the upper skin and supporting the lower end of each BTU housing. The lower skin also includes a generally planar sheet, usually a metal sheet, and in practice a plurality of elongate, metal, channel-section reinforcing members will usually be interposed between the skins such that each BTU housing extends into the interior of the deck panel between the parallel side walls of a respective reinforcing member and the integral base wall of each channel extends beneath its respective BTUs so that the lower skin beneath the BTUs is double thickness consisting of the channel base wall and the associated region of the lower sheet. It will be appreciated that in such an arrangement the lower skin beneath each BTU takes the loads imposed on the BTUs in use. While the ball of each BTU is spring mounted within the respective BTU housing it is nevertheless found that repeated shock loadings imposed on BTUs can cause localised distortion of the lower skin of the deck panel immediately beneath those BTUs which are subjected to the heaviest shock loading in use. Such deformation is more prevalent where the lower skin is apertured to receive a non-circular, downwardly projecting, spigot of the BTU housing to locate the BTU housing against rotation relative to the deck panel, the periphery of such apertures being distorted downwardly onto the plane of the lower skin of the panel.

Localised deformation of the lower skin of the deck panel can result in some of the BTUs being displaced downwardly relative to the panel so that their ability to provide support for a cargo unit is prejudiced or lost completely. This in turn can result in a high friction contact between the cargo unit and the deck panel reducing the efficiency of the deck panel, and perhaps leading to failure to permit satisfactory loading of the aircraft. Conventionally, even though only one or two BTUs may have failed in this manner, the remedy is to replace the whole deck panel to permit off-site repair or reconstruction of the damaged deck panel. The monetary, and time costs of such a repair are considerable, and it is an object of the present invention to minimise or obviate this difficulty.

In accordance with the present invention there is provided a support for use with a ball transfer unit associated, in use, with a double-skinned deck panel, the support being elongate, rigid, and adapted at one end to receive the housing of a ball transfer unit and to seat beneath a peripheral shoulder of the housing which is presented in use towards the lower skin of the panel, the support further being shaped at its opposite end to present to the lower skin of the panel, in use, a "foot-print" which includes and exceeds the a "foot-print" presented in use by the ball transfer unit housing to the lower skin of the panel, the length of the support being such that, in use, with the "foot-print" of the support engaging the lower skin of the panel, the ball of the ball transfer unit protrudes from the upper skin of the panel by a predetermined, desired amount.

Conveniently said one end of said support includes one or more keying formations engaging the housing of the ball transfer unit in use to limit or prevent angular movement of the ball transfer unit relative to the support about the longitudinal axis of the support.

Preferably the "foot-print" of said opposite end of said support is non-circular so as to be able to co-operate with one or more abutments of the deck panel in use to limit or prevent angular movement of the support relative to the deck panel in use about the longitudinal axis of the support.

Desirably said one end of said support is frusto-conical.

The invention further resides in the combination of a support as defined above with a ball transfer unit, and still further resides in the combination of a ball transfer unit, a support as defined above, a double-skinned deck panel, and a method of repairing a deck panel. Conveniently the double-skinned deck panel includes upper and lower generally parallel skins with reinforcing channel section members interposed therebetween, the base walls of the channels defining parts of the lower skin in use.

One example of the present invention will now be described with reference to the accompanying drawings wherein.

Figure 1:
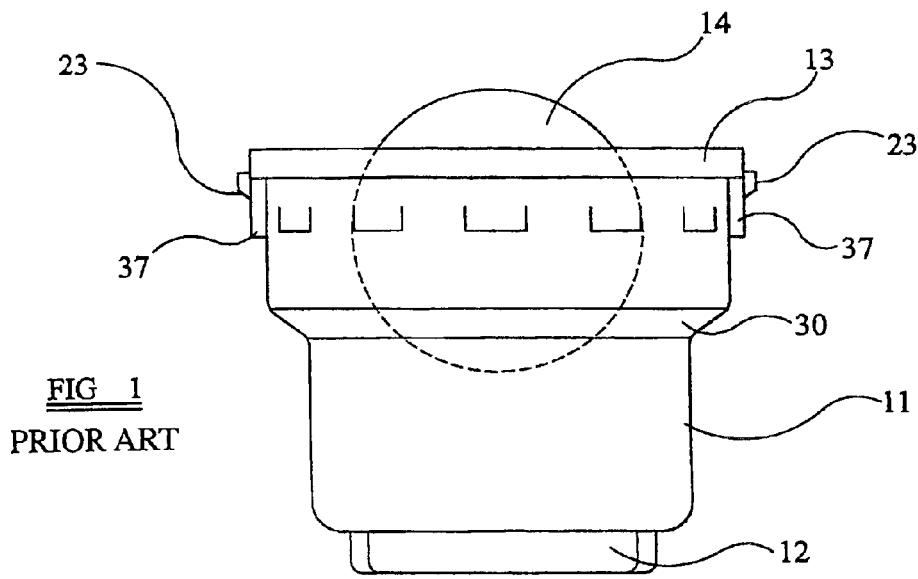
FIG. 1 is a diagrammatic side elevational view of a conventional ball transfer unit.

Referring to the drawings, a conventional BTU comprises a stepped cylindrical housing 11 closed at one end by an integral non-circular base spigot 12, and partially closed at its opposite end by a cap 13. A large diameter polished stainless steel ball 14 is supported within the housing 11 and protrudes through an appropriately sized aperture of the cap 13. Within the housing 11 the ball 14 is seated in a low friction bearing which allows the ball 14 to rotate in any direction. Conveniently the bearing is a ball bearing assembly the ball race of which is supported by an axial compression spring interposed between the ball race and the base 12 of the housing 11. The spring urges the ball upwardly relative to the housing 11 to protrude through the cap 13 by an amount determined by the diameter of the aperture in the cap 13. The sliding interface of the ball 14 with the cap 13 may be provided with a low-friction lining such as a PTFE collar. Such BTUs are well known, and can take a variety of different forms, such differences being irrelevant to the present invention.

One particular use of such BTUs is in a ball mat for use in the cargo hold of an aircraft. A ball mat is a deck panel, usually a double-skinned deck panel, which may be as much 150 cm (approximately 5 feet) square and which may incorporate a multitude of BTUs disposed in a predetermined array, the balls of the BTUs projecting by a predetermined amount through the top surface of the panel to support cargo units for low friction movement relative to the panel. Conventionally such a deck panel will comprise upper and lower parallel skins 16, 17 of planar metal sheets and in the panel 15 shown diagrammatically in FIGS. 2 and 4 a plurality of elongate metal, channel-section reinforcing members (one of which is shown at 18) are interposed between, and secured to, the upper and lower metal sheets. Thus the lower skin 17 is in part double thickness being defined in those parts by the base walls 19 of metal channel section elements 18 and the lower metal sheet 20.

The upper skin 16 of the deck panel 15 is formed, in relation to each BTU 11, with a circular aperture 21 the diameter of which is fractionally larger than the diameter of the cap 13 of the BTU 11. Each BTU sits within the panel 15 with its cap 13 disposed in a respective aperture 21 and the upper surface of the cap 13 flush with the upper surface of the upper skin 16. At its lower end the housing 11 of each BTU seats against the inner surface of the lower skin 17 of the panel with the non-circular spigot 12 extending downwardly into correspondingly non-circular apertures 22, 22a in the layers 19, 20 of the skin 17. The peripheral shoulder of the housing 11 defined around the spigot 12 abuts the inner surface of the skin 17 to support the BTU in the desired position relative to the panel 15, and the inter-engagement of the spigot 12 in the aperture 22 prevents rotation of the BTU, about the longitudinal axis of the housing 11, relative to the panel. Although not apparent in FIG. 2 the housing 11 is provided with first and second diametrically opposed spring loaded pins 23 (FIGS. 1, 3 and 4) which can protrude radially from the housing 11 to engage beneath the skin 16 to prevent the BTU being lifted from the panel 15 through the aperture 21. In known manner a tool, and tooling apertures in the cap 13 are provided to facilitate manual withdrawal of the pins 23 to release the BTU for withdrawal upwardly from the panel 15 through the aperture 21 when necessary. It will be understood by those familiar with BTUs that the pins 23 snap into position beneath the skin 16 when the BTU is correctly orientated within the panel.

Figure 4:
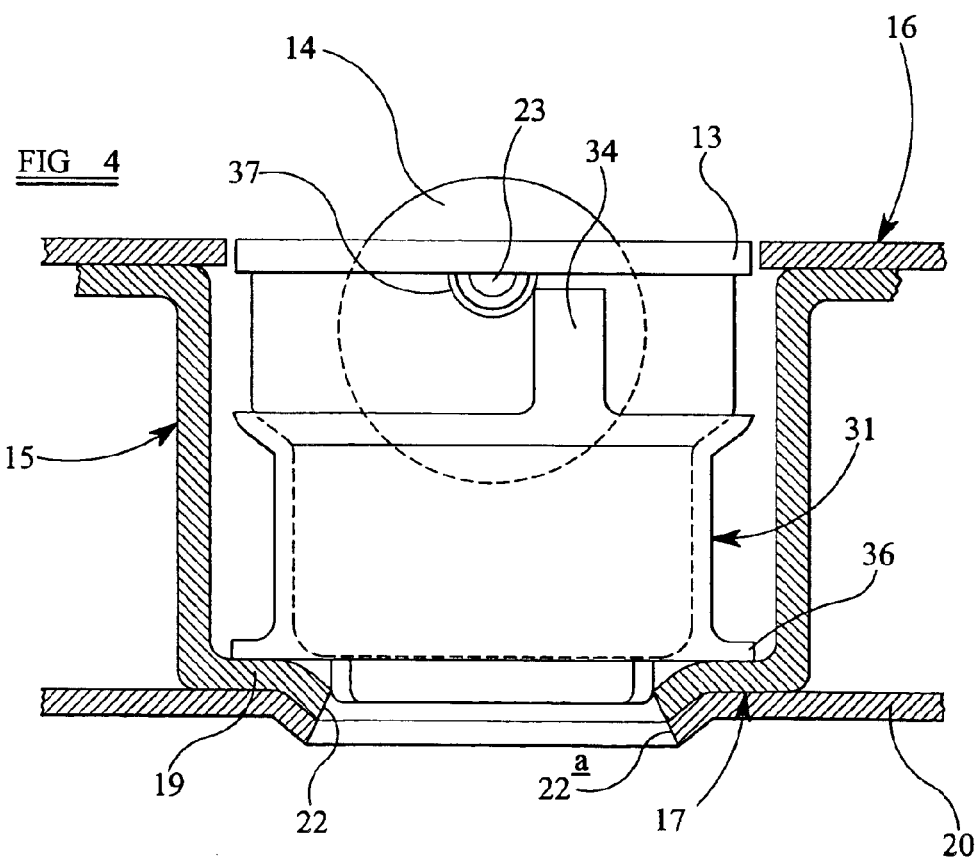
FIG. 4 is a view similar to FIG. 2, but illustrating a BTU and support combination of the kind shown in FIG. 3 housed within a double-skinned deck panel.

The arrangement described so far is conventional. It is found that in some environments cargo units may impact heavily on certain areas of deck panels and although the spring mounting of the balls 14 of the BTUs will absorb such shock loadings it is found that after repeated incidents there is a tendency for both layers 19, 20 of the lower skin 17 of the panel 15 to distort downwardly around the apertures 22, 22a as illustrated in FIG. 4. Such downward distortion of the skin 17 repositions the affected BTUs lower in the deck panel 15 than the surrounding BTUs with the effect that certain regions of the panel become less effective at supporting and transporting cargo units. A situation can be reached at which the ball 14 of an affected BTU no longer protrudes from the skin 16, and thus there will be a region of the deck panel at which there is no support for a cargo unit and a high friction contact between the cargo unit and the skin 16 will result. This in turn can result in the failure of the cargo handling system associated with the or each damaged deck panel and conventionally such a failure is dealt with by removal of the or each deck panel and replacement by a new deck panel, the removed damaged deck panel being taken out of the aircraft for off-site repair or reconstruction.

FIGS. 3 to 9 inclusive illustrate a support for a BTU which can obviate the need to remove and replace a damaged deck panel. The support 31 is in the form of an elongate rigid metal sleeve, conveniently aluminium or other lightweight metal, although it is to be understood that in some applications the support may be a plastics moulding, with or without reinforcing fibres in the moulding. The sleeve of the support 31 includes an intermediate section 32 of uniform, circular cross-section terminating at one end, which will be the uppermost end in use, in an axially short expanded region 33 of circular frusto-conical form. Integral with the end region 33 and projecting axially are first and second angularly spaced lugs 34.

The opposite axial end of the support 31 has a second, axially short, expanded region of frusto-conical form 35 terminating at its widest end, remote from the intermediate section 32, in a planar foot 36 extending at right angles to the axis of the support.

Figure 5:
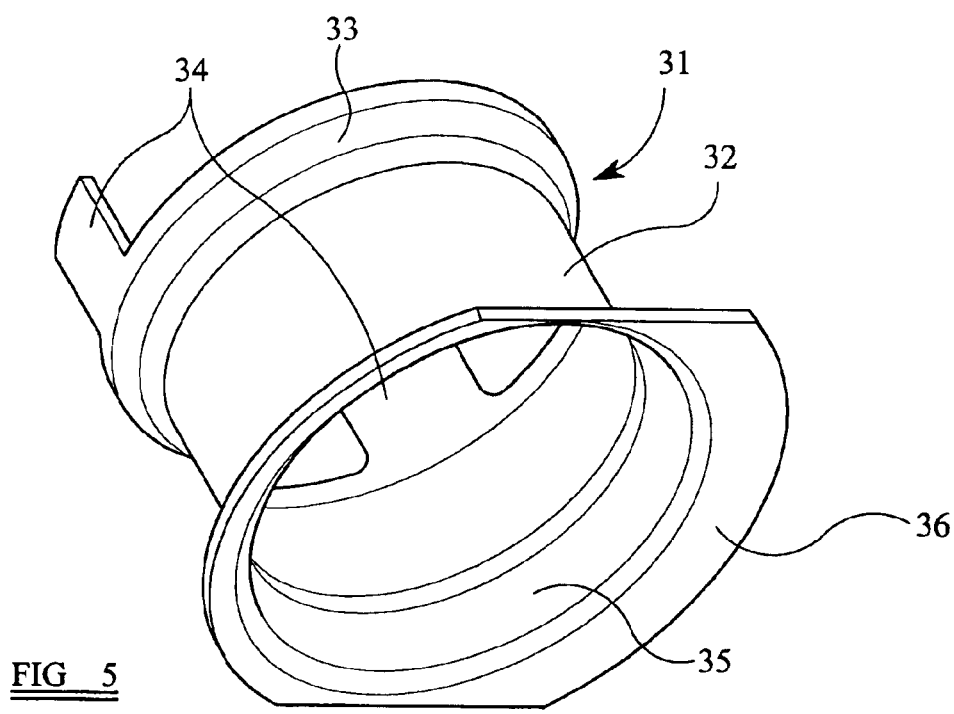
FIG. 5 is a diagrammatic perspective view of the support member in accordance with one example of the present invention.
Figure 6:
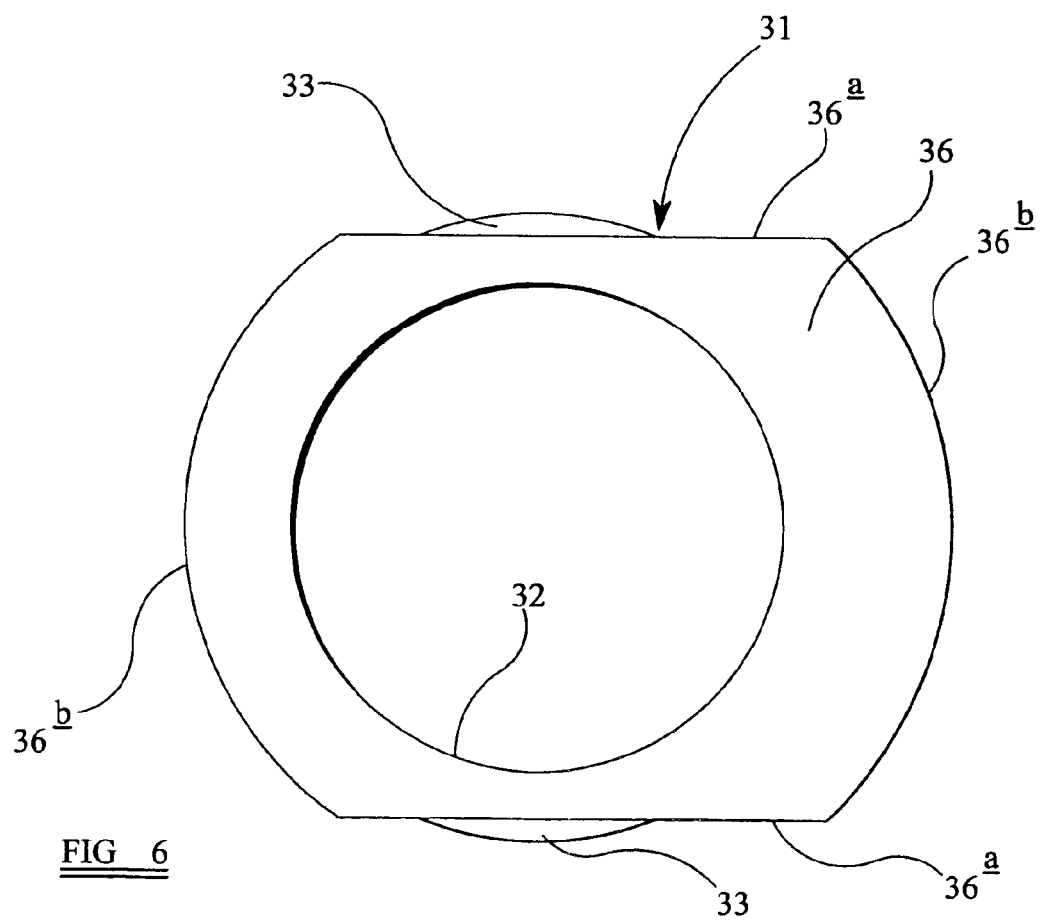
FIG. 6 is a plan view from beneath the support of FIG. 5.
Figure 7:
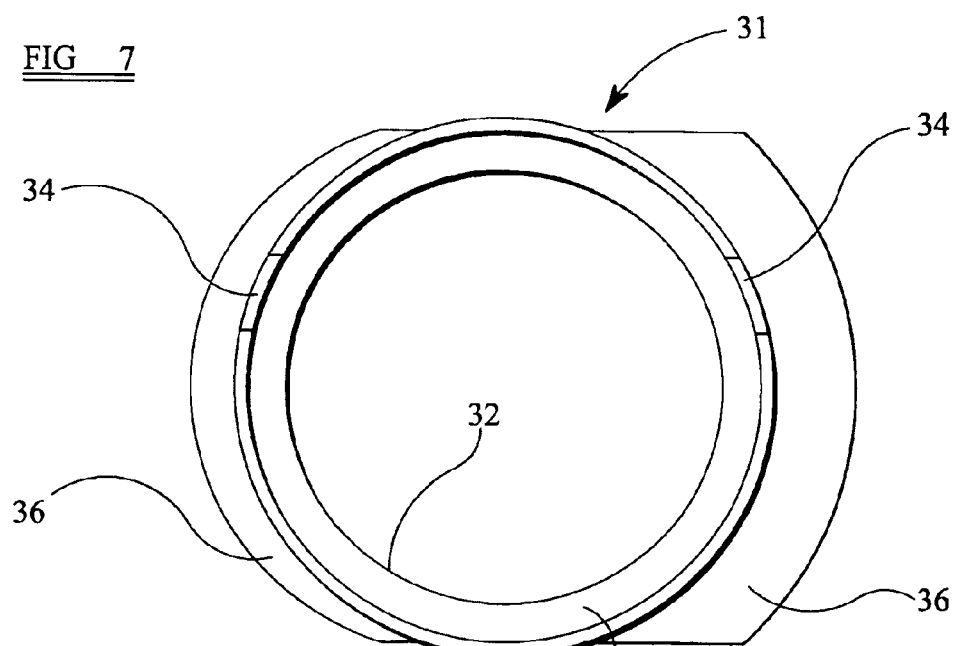
FIG. 7 is a plan view from above the support of FIG. 5.
Figure 8:
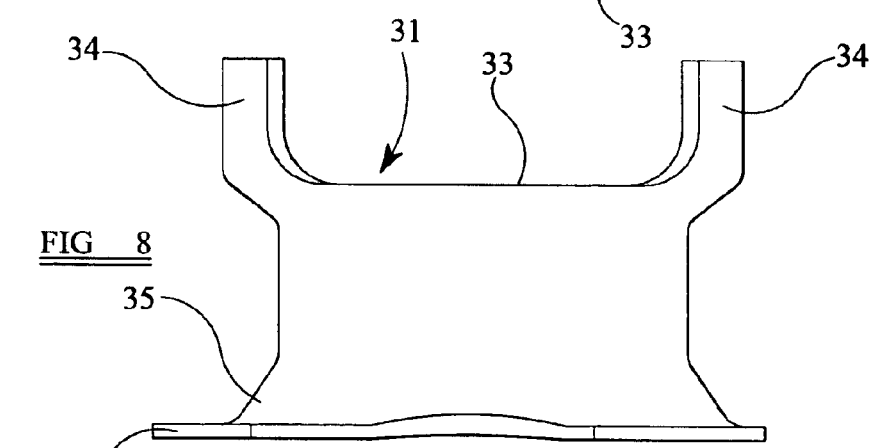
FIG. 8 is a side elevational view of the support of FIG. 5.
Figure 9:
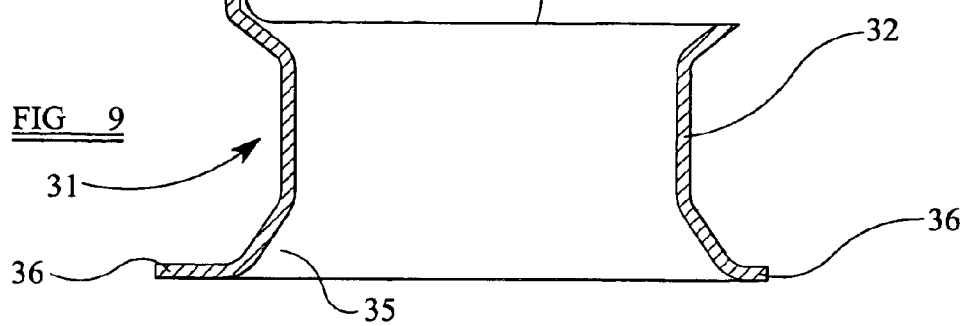
FIG. 9 is a transverse cross-sectional view of the support of FIG. 5.

As is best seen in FIGS. 5 and 6 the foot 36 is non-circular. The foot 36 is elongate, projecting further at one side of the axis of the support than at the opposite side. The foot has a pair of parallel rectilinear edges 36a interconnected at their ends by curved end surfaces 36b. The edges 36a are spaced equally on opposite sides of the axis of the support, and the spacing between the edges 36a is slightly less than the maximum diameter of the expanded region 33 at the opposite end of the support. However, the spacing between the cured end surfaces 36b of the foot, measured parallel to the side edges 36a, significantly exceeds the maximum diameter of the region 33, there being a greater protrusion of the foot 36 at one side of the axis of the support than at the opposite side. This configuration is best shown in FIG. 6.

Figure 3:
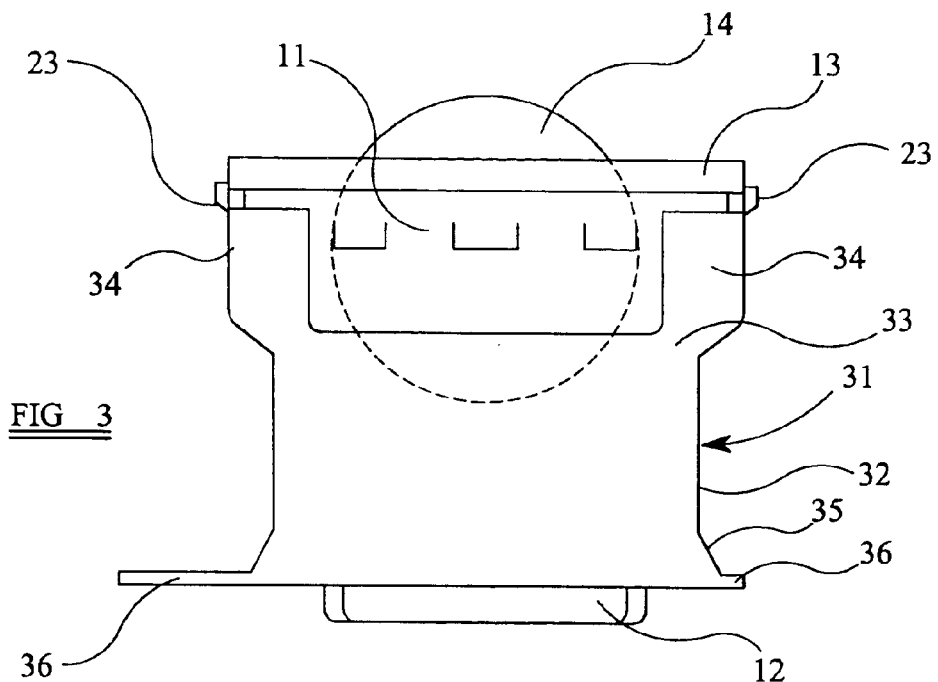
FIG. 3 is a diagrammatic side elevational view of a ball transfer unit of the kind shown in FIG. 1 in combination with a support in accordance with one example of the present invention.

FIGS. 3 and 4 illustrate the manner in which the support 31 is utilised in conjunction with a BTU. Let us assume that a deck panel, in situ within an aircraft cargo compartment, has sustained damage such that a BTU is disposed below the level of the upper skin 16 of the panel. FIG. 4 shows the distortion of the lower skin 17 around the apertures 22, 22a which can cause such a mispositioning of the BTU. It can be seen in FIG. 4 that in the absence of the support 31 the BTU would be positioned significantly lower within the panel by virtue of the downward distortion of the skin 17. In order to utilise the support 31 to correct such a damaged deck panel, without the need to remove the deck panel from the aircraft, the BTU is removed upwardly through the aperture 21 of the skin 16 of the panel utilising the aforementioned tool to withdraw the pins 23. Assuming that the BTU itself is undamaged, then the BTU is inserted, with the spigot end 12 foremost, into the enlarged frusto-conical region 33 of a support 31. A frusto-conical shoulder 30 formed on the wall of the housing 11 of the BTU seats in the region 33 of the support 31 to limit the insertion of the BTU into the support 31. With the BTU housing 11 correctly seated within the support 31 the upper, free ends of the lugs 34 terminate just beneath the protruding edge of the cap 13 and extend immediately adjacent integral, pin supporting protrusions 37 on the housing 11. Abutment between the protrusions 37 and the upper ends of the lugs 34 thus prevents, or restricts, rotation of the BTU within the support 31 about the common longitudinal axis of the support and the BTU.

Holding the BTU and the support 31 as a unit, the unit is offered to the aperture 21 in the skin 16 of the damaged panel. The width of the foot 36 is slightly less than the diameter of the aperture 21, but the extended length of the foot 36 is significantly greater than the diameter of the aperture 21. Thus in order to insert the unit through the aperture 21 it is necessary to introduce the curved end of the longer of the two projecting portions of the foot 36 through the aperture 21, holding the unit with its axis inclined to the plane of the surface 16. Thereafter, it is possible to manipulate the unit to allow the opposite curved edge of the foot 36 to pass through the aperture 21 whereupon the unit can be lowered into the deck panel until the foot 36 seats on the inner surface of the skin 17. The overall axial length of the support 31 is such that with the foot 36 seated on the inner surface of the skin 17 and the housing of the BTU properly seated within the support 31 then the cap 13 is again co-planar with the surface of the skin 16 so that the ball 14 of the BTU is correctly orientated relative to the surface of the deck panel.

The width and length dimensions of the foot 36 are significantly greater than the diameter of the aperture 22, and thus notwithstanding the deformation of the skin 17 bordering the aperture 22 the foot 36 will seat upon an undeformed region of the skin 17 so that the degree of distortion of the skin around the aperture 22 can be ignored. It will be recognised that the foot 36 will be as large as possible consistent with being insertable through the aperture 21. The "foot-print" which the foot 36 presents to the skin 17 is significantly larger than the "foot-print" which the housing 11 of the BTU presents to the skin 17, the width of the "foot-print" being as close as possible to the distance between the side walls of the channel member 18. It is believed that the term "foot-print" as used herein will be clear to the skilled man but for the avoidance of doubt the term is intended to indicate the area or region of, for example, the skin 17 which would be obscured by a component, for example the support 31 or the housing 11 in the normal engagement thereof with the skin 17.

Figure 2:
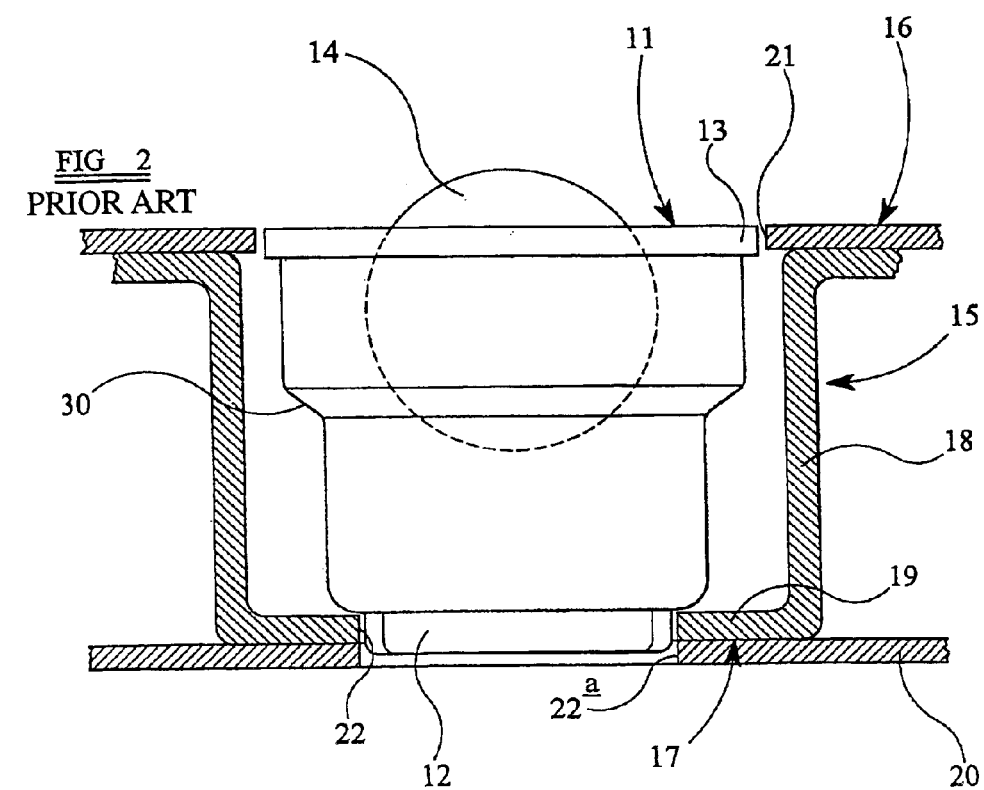
FIG. 2 is a diagrammatic transverse cross-sectional view of a conventional double-skinned deck panel housing a ball transfer unit of the kind illustrated in FIG. 1.

It will be recalled that in the standard configuration the spigot 12 of the housing 11 of the BTU is non-rotatably engaged in the aperture 22. In order to ensure that the combination of the BTU and the support 31 is non-rotatable, firstly the protrusions 37 co-operate with the lugs 34 of the support to prevent or limit freedom for rotational movement of the BTU relative to the support 31, and secondly the elongate nature of the foot 36 enables the foot to co-operate with side walls of the channel member 18 to limit freedom for rotational movement of the support 31 within the deck panel. In an environment in which the deck panel does not include reinforcing members 18 then there may be no mechanism for preventing rotation of the support 31 relative to the lower skin 17. However, generally members 18 or an equivalent are incorporated and the BTUs extend between the side walls of the channel section members as illustrated in FIGS. 2 and 4.

It will be recognised therefore that the provision of the support 31 facilitates simple, effective and extremely swift repair of a damaged deck panel, and moreover provides a repair which can be effected in situ thereby obviating any need to remove the deck panel for repair. It will be understood that minor changes in the shape of the support 31 to match the support 31 to different forms of BTU, and different deck skin arrangements, is well within the ambit of the skilled man.

We claim:

1. A support for use with a ball transfer unit associated, in use, with a double-skinned deck panel, the support being elongate, rigid, and adapted at one end to receive the housing of a ball transfer unit and to seat beneath a peripheral shoulder of the housing which is presented in use towards the lower skin of the panel, the support further being shaped at its opposite end to present to the lower skin of the panel, in use, a "foot-print" which includes and exceeds the "foot-print" presented in use by the ball transfer unit housing to the lower skin of the panel, the length of the support being such that, in use, with the "foot-print" of the support engaging the lower skin of the panel, the ball of the ball transfer unit protrudes from the upper skin of the panel by a predetermined, desired amount, said one end of said support including one or more keying formations engaging the housing of the ball transfer unit in use to limit or prevent angular movement of the ball transfer unit relative to the support about the longitudinal axis of the support.

2. A support as claimed in claim 1, wherein the "foot-print" of said opposite end of said support is non-circular so as to be able to co-operate with one or more abutments of the deck panel in use to limit or prevent angular movement of the support relative to the deck panel in use about the longitudinal axis of the support.

3. A support as claimed in claim 2, wherein said one end of said support is frusto-conical.

4. A support as claimed in claim 1 in combination with a ball transfer unit, the unit being received within said one end of said support and seating on a support surface of said support.

5. A double-skinned deck panel in combination with a support and ball transfer unit assembly as claimed in claim 4, support being received between upper and lower skins of the panel and supporting the unit such that a ball thereof protrudes by a predetermined amount above the level of the upper skin.

6. A panel as claimed in claim 4, having reinforcing channel section members interposed between said upper and lower skins, a wall of the channels defining part of the lower skin in use.

7. A support for use with a ball transfer unit associated, in use, with a double-skinned deck panel, the support being elongate, rigid, and adapted at one end to receive the housing of a ball transfer unit and to seat beneath a peripheral shoulder of the housing which is presented in use towards the lower skin of the panel, the support further being shaped at its opposite end to present to the lower skin of the panel, in use, a "foot-print" which includes and exceeds the "foot-print" presented in use by the ball transfer unit housing to the lower skin of the panel, the length of the support being such that, in use, with the "foot-print" of the support engaging the lower skin of the panel, the ball of the bail transfer unit protrudes from the upper skin of the panel by a predetermined, desired amount, said "foot-print" of said opposite end of said support being non-circular so as to be able to co-operate with one or more abutments of the deck panel in use to limit or prevent angular movement of the support relative to the deck panel in use about the longitudinal axis of the support.

8. A support as claimed in claim 7, wherein said one end of said support is frusto-conical.

9. A support as claimed in claim 7 in combination with a ball transfer unit, the unit being received within said one end of said support and seating on a support surface of said support.

10. A double-skinned deck panel in combination with a support and bail transfer unit assembly as claimed in claim 9, the support being received between upper and lower skins of the panel and supporting the unit such that a ball thereof protrudes by a predetermined amount above the level of the upper skin.

11. A panel as claimed in claim 9, having reinforcing channel section members interposed between said upper and lower skins, a wall of the channels defining part of the lower skin in use.

12. A method of repairing a double-skinned deck panel supporting a bail transfer unit (BTU), comprising the steps of extracting the BTU from the deck panel to leave the interior of the panel accessible by way of an access aperture within which the BTU is normally located, introducing the or a replacement BTU into an elongate, rigid support which is adapted at one end to receive an outer housing of said BTU and to seat beneath a peripheral shoulder of said BTU housing which is presented in use towards a lower skin of said double-skinned panel, manipulating the combination of BTU and support at least by tilting the combination so that its longitudinal axis is inclined to the plane of the deck panel to insert said opposite end of said support through said aperture and inserting said combination further into said panel so that said opposite end of said support seats against the inner face of the lower skin of said panel and supports said BTU on the lower skin of the panel, the support further being shaped at its opposite end to present to said lower skin of the panel, a "foot-print" which includes and exceeds the "footprint" presented in use by said BTU housing to said lower skin of the panel, the length of the support being such that with the "foot-print" of the support engaging said lower skin of the panel, the ball of the ball transfer unit protrudes from the upper skin of the panel by a predetermined, desired amount.

* * * * *